United States Patent [19]

Wähling et al.

[11] Patent Number: 4,680,984
[45] Date of Patent: Jul. 21, 1987

[54] TORSIONAL VIBRATION DAMPER

[75] Inventors: Werner Wähling, Kraiburg/Inn; Günther Ziegler, Walkraiburg, both of Fed. Rep. of Germany

[73] Assignee: SGF Suddeutsche Gelenkscheibenfabrik GmbH & Co. KG, Waldkraiburg, Fed. Rep. of Germany

[21] Appl. No.: 823,483
[22] PCT Filed: May 20, 1985
[86] PCT No.: PCT/EP85/00238
§ 371 Date: Jan. 6, 1986
§ 102(e) Date: Jan. 6, 1986
[87] PCT Pub. No.: WO85/05663
PCT Pub. Date: Dec. 19, 1985

[30] Foreign Application Priority Data

Jun. 1, 1984 [DE] Fed. Rep. of Germany ....... 3420570

[51] Int. Cl.$^4$ .............................................. F16F 15/12
[52] U.S. Cl. ........................................ 74/574; 464/89
[58] Field of Search ...................... 74/574, 573, 572; 464/89, 87, 93, 180

[56] References Cited

U.S. PATENT DOCUMENTS

| 1,718,208 | 6/1929 | Anibal | 74/574 |
|---|---|---|---|
| 1,892,793 | 1/1933 | Warner | 74/574 |
| 1,916,309 | 7/1933 | Griswold | |
| 2,548,839 | 4/1951 | Coombes | 295/11 |
| 3,273,419 | 9/1966 | Kollmann et al. | 74/573 |
| 3,477,311 | 11/1969 | McGreary | 74/574 |
| 3,945,269 | 3/1976 | Bremer | 74/574 |
| 3,988,073 | 10/1976 | Eastman et al. | 74/574 X |
| 4,114,472 | 9/1978 | Hornig et al. | 74/574 |
| 4,252,227 | 2/1981 | Straub, Jr. | 192/106 |
| 4,516,955 | 5/1986 | Worner et al. | 464/89 |

FOREIGN PATENT DOCUMENTS

| 1575752 | 1/1970 | Fed. Rep. of Germany . | |
| 3336174 | 5/1985 | Fed. Rep. of Germany | 74/574 |
| 349353 | 5/1931 | United Kingdom . | |
| 557133 | 11/1943 | United Kingdom . | |
| 664119 | 1/1952 | United Kingdom . | |

Primary Examiner—Gary L. Smith
Assistant Examiner—Rodney M. Lindsey
Attorney, Agent, or Firm—Webb, Burden, Robinson & Webb

[57] ABSTRACT

A support (10) having fastening spots (12) for mounting at a shaft flange is enclosed by a flywheel (18) at a radial spacing and connected to the same by rubber-elastic spring elements (20) arranged circumferentially spaced from one another. The spring elements (20) are formed with rolling curves (22,24) between which rigid rolling bodies (32) are supported under radial bias. The rolling bodies (32) are inserted upon vulcanizing of the spring elements (20). The diameter of the rolling bodies influences the characteristic frequency of the torsional vibration damper and for this reason is so selected that the desired characteristic frequency will result. The rolling bodies (32) furthermore contribute substantially to prevent radial vibrations and tumbling of the flywheel (18).

7 Claims, 6 Drawing Figures

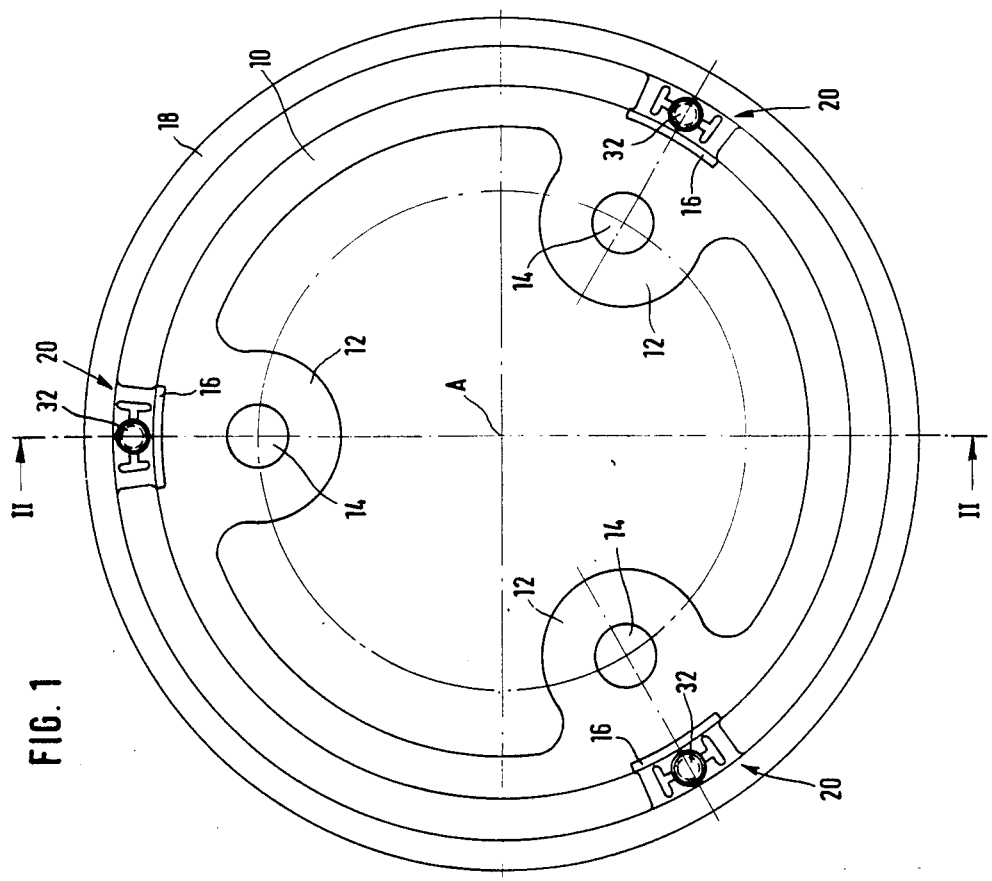

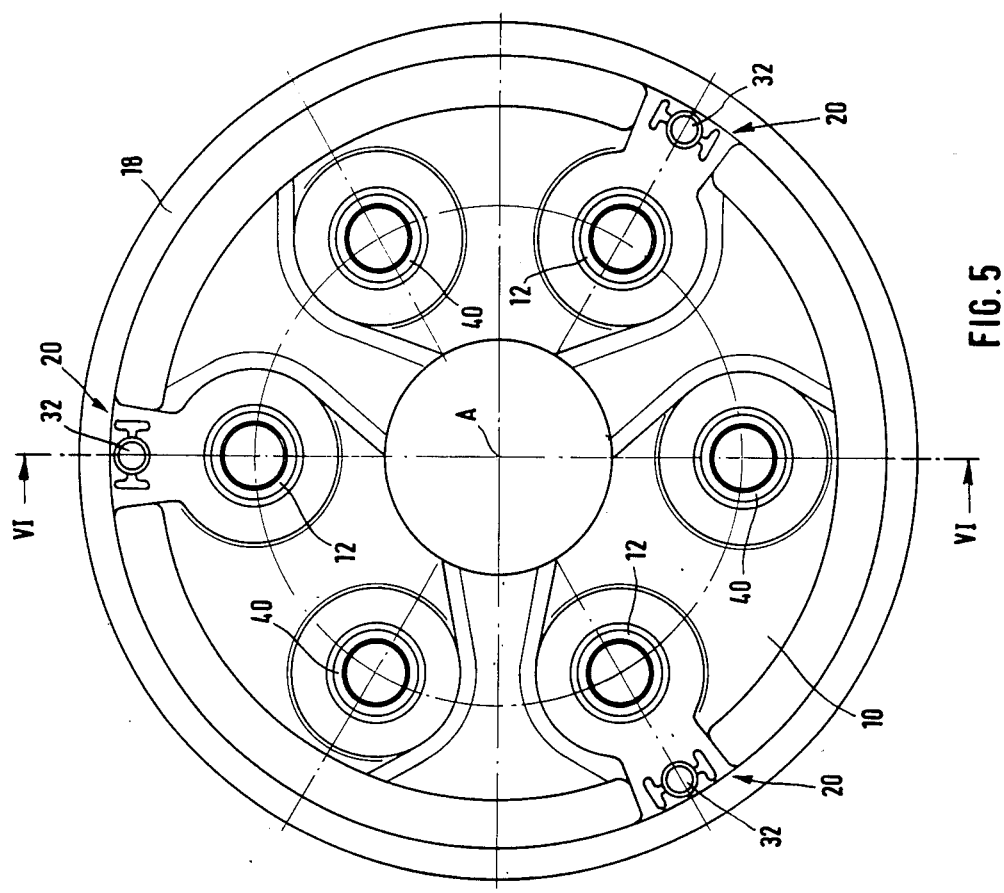

TORSIONAL VIBRATION DAMPER

The invention relates to torsional vibration dampers, especially for motor vehicles, comprising a support which has fastening spots for mounting at a shaft flange and the like, a flywheel arranged coaxially with the support and radially spaced from the same, and a plurality of spring elements disposed circumferentially spaced from one another between the support and the flywheel and interconnecting the two.

In a known torsional vibration damper of this kind (DE-B- No. 2 508 212) the support is a stamped sheet metal member having the shape of a rounded equilateral triangle the corners of which, serving as fastening spots, are formed with a through bore for a screw. The flywheel is embodied by a circular ring which encloses the support at relatively small radial spacing from the rounded corners thereof. The space between the support and the flywheel is substantially filled with rubber which is subdivided into individual spring elements by slots in the range of the rounded corners of the support and by recesses in the central range of the longitudinal sides of the support.

It is difficult in manufacturing this known torsional vibration damper to maintain a given characteristic frequency with sufficient accuracy. Manufacturers of motor vehicles into which such torsional vibration dampers are installed, for example, prescribe a characteristic frequency of 60 Hz at tolerance limits of no more than ±4 Hz. The characteristic frequency of a torsional vibration damper of the generic kind in question among others depends on the nature of the spring elements. Usually these are made of rubber whose hardness suffers variations by which the tolerance limit mentioned of the characteristic frequency can be maintained with great difficulty only. Moreover, the known torsional vibration dampers of the kind described tend to vibrate radially and tumble, undergoing vibrations which, at best, can be minimized but not suppressed altogether because of close dimensions of the slots between the rounded edges of the support and the flywheel.

In another torsional vibration damper (DE-A- No. 2 455 385) a hub member is connected torsionally elastically by radial spokes to an outer member surrounding the hub member like a ring and carrying a flywheel, and elastomer bodies are received in corresponding recesses of the hub member and of the outer member. The elastomer bodies either are cylindrical or shaped like rectangular prisms and, in both cases, tightly enclosed by the recesses, whereby torsional vibrations can be damped only by deformations of the elastomeric bodies.

Elastomer bodies damping torsional vibrations in similar manner are known in connection with elastic couplings (DE-B- No. 1 008 063 and DE-B- No. 1 067 644). These elastomer bodies must transmit the full operating torque from one clutch half to the other.

With all of these known arrangements the elastomeric bodies are subjected to heavy stress and they cannot prevent the structural members which are torsionally vibrating with respect to each other from making radial and tumbling relative motions.

It is, therefore, the object of the invention to develop a torsional vibration damper of the kind specified initially such that a given characteristic frequency can be maintained within closer limits than before and the tendency of vibrating radially and tumbling can be eliminated practically completely.

This object is met, in accordance with the invention, in that rolling curves of rubber-elastic material are arranged at the support and flywheel between which curves rigid rolling bodies are supported under radial bias, and matching rolling curves are formed so as to converge in circumferential direction at both sides of the corresponding rolling body, being formed by a layer of the rubber-elastic material which becomes progressively thicker in circumferential direction toward both sides.

In accordance with the invention each individual rolling body adopts a defined central position when at rest. Any excursion of the flywheel in circumferential direction with respect to the support is opposed by an increasing return force. This results in return moments which are added to the return moments of the spring elements.

The invention also provides possibilities of influencing the characteristic frequency of a torsional vibration damper depending, in addition to the magnitudes of influence so far, on the design and dimensioning of the rolling curves as well as the rolling bodies. For instance, if the characteristic frequency of a finished torsional vibration damper proves to be too small, it may be augmented by inserting rolling bodies whose diameter is somewhat greater than originally provided. The rigid rolling bodies have the further advantage of still centering the flywheel if one or more of the spring elements as such has or have become ineffective, such as by parting of the rubber or fatigue cracking.

The rolling bodies preferably are rollers arranged with their axes parallel to the axis of the support and flywheel. Such rollers, as compared to balls of the same diameter which would also be suitable in principle, help to minimize surface contact pressures occurring at the rolling curves and are particularly effective in suppressing tumbling of the flywheel.

If the rolling bodies are embodied by rollers, preferably they are provided with a central constriction in diabolo fashion, and a web formed at the support and/or at the flywheel and extending in circumferential direction engages in the constriction. Upon inserting such a rolling body between the associated rolling curves, the at least one web snaps into the constriction, thereby securing the rolling body in simple manner against falling out.

The rolling curves according to the invention may be arranged independently of the spring elements at the support and flywheel, for example in the middle between two spring elements each which may be embodied by steel springs for instance. Preferably, however, the invention is applied to torsional vibration dampers whose spring elements consist of rubber-elastic material. In this event, it is provided as an especially convenient embodiment of the invention that the rolling curves are formed at the spring elements.

The latter embodiment conveniently is developed further in that the rolling curves terminate in T-shaped slots and that also the webs form part of the spring elements.

The characteristic of the return forces can be influenced to an even greater extent by having the webs converge more strongly than the rolling curves. Under these circumstances the webs exert return forces on the rolling bodies in the area of the constrictions at a point in time already when the rolling curves proper do not yet exert any return forces, or but small ones, on the areas of the rolling bodies at either side of the constrictions. The magnitude of the return forces exerted by the webs also depends on the width of the webs. Rolling bodies having constrictions thus afford especially diverse possibilities of influencing the behavior of a torsional vibration damper.

Embodiments of the invention will be described further below with reference to diagrammatic drawings, in which:

FIG. 1 is a top plan view of a torsional vibration damper according to the invention;

FIG. 2 is the cut II—II in FIG. 1;

FIG. 5 is top plan view of a torsional vibration damper according to the invention integrated in a flexible disc, and FIG. 6 is the cut VI—VI in FIG. 5.

Figure 3:
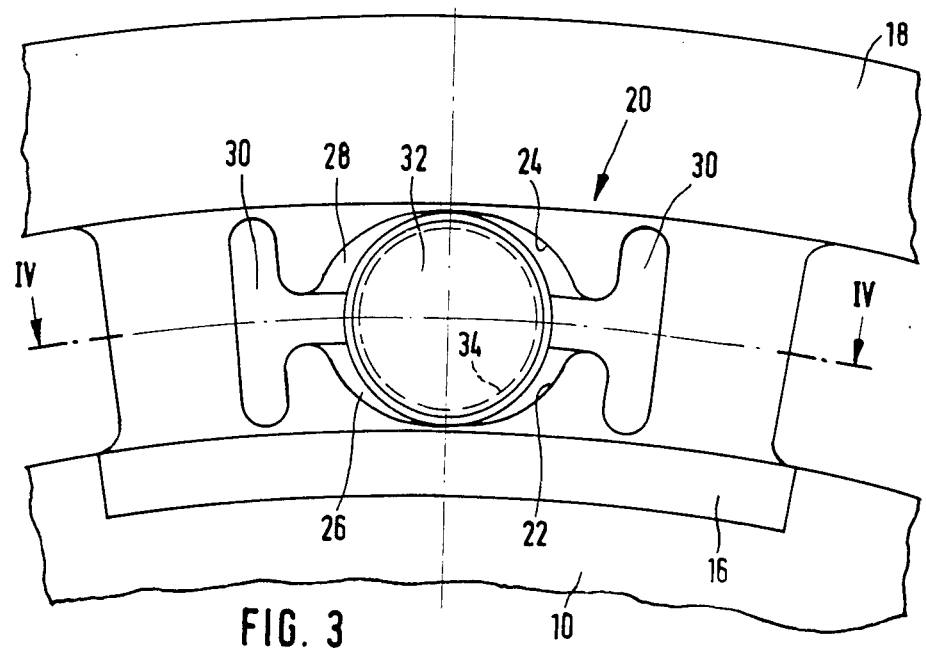
FIG. 3 is an enlarged cut-out of FIG. 1.
Figure 4:
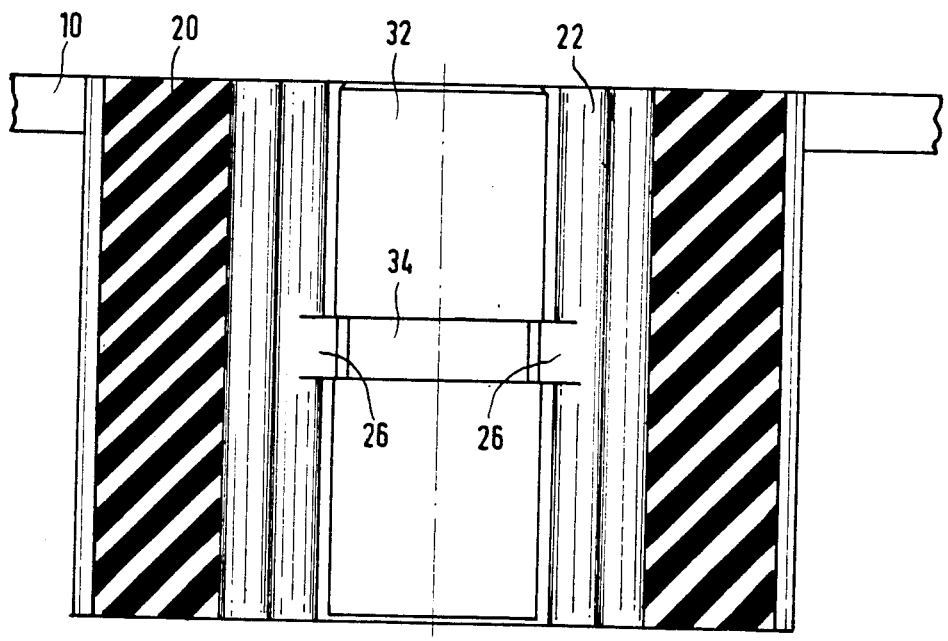
FIG. 4 is the cut IV—IV in FIG. 3.

The torsional vibration damper illustrated in FIGS. 1 to 4 is associated with a shaft (not shown) having axis A. It comprises a support 10 punched out of sheet steel and having three fastening spots 12 which are offset by 60° from one another with respect to the axis A and each formed by a lug protruding radially inwardly and having a bore 14 o receive a fastening screw. A collar piece 16 is formed at the support 10 by bending the sheet metal of which the latter is made radially outside of each fastening spot 12. The collar pieces 16 form parts of an imagined cylinder which has the axis A and is enclosed at a radial spacing by an annular steel flywheel 18 coaxial with the support 10.

The space between each one of the collar pieces 16 and the flywheel 18 is bridged by a spring element 20 which permits torsional vibrations of the flywheel 18 with respect to the support 10 about axis A. The spring elements 20 are made of rubber attached by vulcanizing to the outside of the respective collar piece 16 and the inside of the flywheel 18 and having a continuous paraxial cavity. In the central range of each spring element 20 the cavity is defined by two radially opposed rolling curves 22 and 24, the first of which is coordinated with the support 10 and the second one with the flywheel 18.

In their central range the rolling curves 22 and 24 are only little spaced radially from the corresponding collar piece 16 and flywheel 18, respectively, and they converge from the central range in both circumferential directions. The rolling curves 22 and 24 thus are formed by a layer of the rubber of which the spring elements 20 are made and which becomes progressively thicker in circumferential direction toward both sides. Each of the rolling curves 22 and 24 is subdivided by a web 26 and 28, respectively, in a plane which is normal to the axis A. The rolling curves 22 and 24 as well as the webs 26 and 28 within each spring element 20 extend between two T-shaped slots 30.

A rigid rolling body 32 is supported under radial bias between the two rolling curves 22 and 24 in each spring element 20. Each rolling body 32 has the shape of a substantially cylindrical roller in parallel with the axis A and formed with a central constriction 34 in which the two associated webs 26 and 28 are locked elastically upon axial installation of the rolling body. All rolling bodies 32 are made of metal or a high-strength polyamide or similar rigid material or composite material.

In the case of the torsional vibration damper shown in FIGS. 5 and 6 and integrated in a flexible disc, the flexible disc substantially consisting of rubber constitutes the support 10. In this support 10 three fastening spots 12 each in the form of a cylindrical sleeve are embedded offset by 60° with respect to one another. A collar piece 16 formed at a flange 36 fitted on the respective sleeve and welded to the same is coordinated with each of these sleeves. Another flange 38 is secured to the end remote from the flange 36 of each sleeve serving as fastening spot 12.

As in the case of the embodiment shown in FIGS. 1 to 4, the three fastening spots 12 according to FIGS. 5 and 6 are provided for fastening the support 10 at a shaft (not shown).

Three further sleeves 40 are embedded in the support 10 in accordance with FIGS. 5 and 6 for fixing to a second shaft. They are each arranged on an angle bisector between two adjacent fastening spots 12 and have the same spacing as those from the axis A.

Otherwise the torsional vibration damper shown in FIGS. 5 and 6 corresponds to the torsional vibration damper according to FIGS. 1 to 5, apart from its integration in a flexible disc.

What is claimed is:

1. A torsional vibrator damper comprising:
   a support which includes fastening means for mounting said support to a shaft flange or the like,
   a flywheel postitioned coaxially around said support and radially spaced therefrom, and
   a plurality of elastomeric spring elements disposed between said support and said flywheel and circumferentially spaced apart from each other, each of said spring elements being connected to an outer surface of said support and an inner surface of said flywheel, each of said spring elements including a cavity therein formed of a pair of opposed, rolling curves of elastomeric material and having a rigid rolling body within said cavity and in contact with said rolling curves and supported therein under radial bias, with said rolling curves converging in a circumferential direction at both sides of an associated rolling body and being formed by a layer of the elastomeric material which becomes progressively thicker in circumferential direction toward both sides of said rolling element, with said rolling curves terminating at each end in a T-shaped slot.

2. The torsional vibration damper as set forth in claim 1 wherein each rolling body is a roller arranged with its axis parallel to the axis of said support and flywheel.

3. The torsional vibration damper as set forth in claim 2 wherein the inner surface of said flywheel in the area of the spring elements is of cylindrical configuration.

4. The torsional vibration damper as set forth in claim 2 wherein the outer surface of said support in the area of the spring elements is of cylindrical configuration.

5. The torsional vibration damper as set forth in claim 2 wherein said support includes a plurality of collars having a cylindrical outer surface and with a spring element mounted to each of said collars.

6. The torsional vibration damper as set forth in claim 2 wherein said rollers are provided in the shape of a diabolo with a central construction and wherein each spring element has one or more webs which extend into said cavity and engage said constriction.

7. The torsional vibration damper as set forth in claim 6 wherein each web converges more strongly than the rolling curves.

* * * * *